(12) United States Patent
Lozovoy et al.

(10) Patent No.: US 11,781,656 B1
(45) Date of Patent: Oct. 10, 2023

(54) KNIFE GATE VALVE

(71) Applicants: Sergey Lozovoy, Almaty (KZ);
Viktoriya Blokhin, Toronto (CA)

(72) Inventors: Sergey Lozovoy, Almaty (KZ);
Viktoriya Blokhin, Toronto (CA)

( * ) Notice: Subject to any disclaimer, the term of this patent is extended or adjusted under 35 U.S.C. 154(b) by 0 days.

(21) Appl. No.: 17/841,783

(22) Filed: Jun. 16, 2022

(51) Int. Cl.
*F16K 3/02* (2006.01)
*F16K 27/04* (2006.01)
*F16K 3/314* (2006.01)

(52) U.S. Cl.
CPC ............ *F16K 3/0281* (2013.01); *F16K 3/314* (2013.01); *F16K 27/044* (2013.01); *Y10T 137/4273* (2015.04)

(58) Field of Classification Search
CPC ...... F16K 3/0281; F16K 3/314; F16K 27/044; Y10T 137/4273; Y10T 137/7036
USPC .... 251/326–329, 335.1–335.3; 137/242, 375
See application file for complete search history.

(56) References Cited

U.S. PATENT DOCUMENTS

| | | | | |
|---|---|---|---|---|
| 2,720,379 A | * | 10/1955 | Williams | F16K 27/105 251/329 |
| 2,873,943 A | | 2/1959 | Williams | |
| 2,953,346 A | * | 9/1960 | Liecke | F16K 7/12 251/327 |
| 2,982,295 A | * | 5/1961 | Williams | F16K 3/0281 251/328 |
| 3,128,078 A | * | 4/1964 | Kosik | F16K 41/10 251/329 |
| 3,160,389 A | * | 12/1964 | Schmitz | F16K 3/28 251/327 |
| 3,217,739 A | | 11/1965 | La Valley et al. | |
| 4,895,181 A | | 1/1990 | McKavanagh | |
| 5,255,893 A | | 10/1993 | Peterson | |
| 5,295,661 A | * | 3/1994 | Roussel | F16K 3/184 251/204 |
| 5,890,700 A | | 4/1999 | Clarkson et al. | |
| 7,458,559 B2 | | 12/2008 | Blenkush | |
| 2004/0124393 A1 | * | 7/2004 | Shimomura | F16K 3/0227 251/360 |
| 2015/0354711 A1 | | 12/2015 | Palomeque | |

* cited by examiner

*Primary Examiner* — John Bastianelli

(57) ABSTRACT

The knife gate valve is designed with at least one sealing belt mounted in the valve body and which act between the valve's seat and the gate to protect them from abrasive wear, the knife gate valve may have at least one cleaning plate to displace abrasive particles from the sealing belt and prevent abrasive particles from getting stuck between it and the seat.

18 Claims, 9 Drawing Sheets

KNIFE GATE VALVE

FIELD OF THE INVENTION

The present invention relates generally to valves. More particularly, the present invention relates to gate valves, sliding gate valves and more specifically to knife gate valves in which it enables reduced abrasive wear.

BACKGROUND OF THE INVENTION

Knife gate valves are well known and provide a cost effective means for operation in the flow of material containing abrasive particles for enabling and disabling the flow of material of gases and/or thick fluids in the technologies proses. The knife gate valve comprises a gate, which is typically a plate is positioned perpendicular to the direct of the flow of material containing abrasive particles. The gate moves between an open position, wherein the flow of material through the orifice of the seat is not obstructed, and a closed position across the orifice of the seat, thus preventing the flow of material through the knife gate valve.

In one configuration of knife gate valve, in the open position the gate retracted from the seat orifice and in the closed position the gate moves across, closes the orifice of the seat and seals the seat. In some embodiments, the end of the gate which moves across the seat is a straight end, and in other configurations the end of the gate has a shape typically semi-circular.

In another configuration of knife gate valve, the gate formed as a plate and includes an aperture (typically corresponding in size and shape to the orifice of the seat) and, in the open position the aperture aligned with the orifice of the seat, while in the closed position the aperture is moved out of the seat area and the gate seals the seat.

Knife gates valves are widely employed in a variety of industries, including petroleum pipelines, petrochemical industries, pulp and paper, waste water treatment facilities, etc. Despite their widespread use, knife gate valves do suffer from problems and/or disadvantages. In particular, in many cases the knife gate valves being controlled the flow of material containing abrasive particles.

Over time, these abrasive particles will wear down knife gates valve components, particularly the gate and the seat, necessitating replacement and/or refurbishment of the knife gates valve—with a commensurate requirement to shut down the controlled system to allow the knife gates valve to be removed from the system for refurbishment or replacement.

US 2004/0124393A1 to Hideyuki Shimomura shows an example of the knife gate valve comparting a main body in which a gland packing and a sealing structure with a seat ring are installed. Valve plate movable installed in the main body.

Seat ring and the gland packing make contact with the valve plate and act as seals to prevent fluid leakage through the valve.

However, these the valve plate, the gland packing and the seat ring are subject to abrasive wear when knife gate valve operated in the flow of material containing abrasive particles. When the valve plate is in the closed position, the abrasive particles are deposited onto the flat surfaces of the valve plate. Then, when the valve plate moves to the open position, the abrasive particles move with it relative to the seat ring and the gland packing. The abrasive particles get between the valve plate, the gland packing and the seat ring and wear them out. As a result, the knife gate valve subject to intense abrasive wear.

U.S. Pat. No. 5,295,661 to Renald Roussel shows an example of the knife valve which has a valve body, a resilient seat, a knife blade and packing rings. Knife blade movable installed in the valve body.

Resilient seat and the packing rings make contact with the knife blade and act as seals to prevent fluid leakage through the knife valve.

However, these the knife blade, the packing rings and the resilient seat are subject to abrasive wear when knife valve operated in the flow of material containing abrasive particles. When the knife blade is in the closed position, the abrasive particles are deposited onto the flat surface of the knife blade. Then, when the knife blade moves to the open position, the abrasive particles move with it relative to the resilient seat and the packing rings. The abrasive particles get between the knife blade, the packing rings and the resilient seat and wear them out. As a result, the knife valve subject to intense abrasive wear.

U.S. Pat. No. 2,873,943 A to John L. Williams shows an example of the stock valve which has a valve body, a resilient seat and a packing are fixed in it. Gate blade movable installed in the valve body.

Resilient seat and a packing make contact with the gate blade and act as seals to prevent fluid leakage through the stock valve.

However, these the gate blade, the packing and the resilient seat are subject to abrasive wear when the stock valve operated in the flow of material containing abrasive particles. When the gate blade is in the closed position, the abrasive particles are deposited onto the flat surface of the gate blade. Then, when the gate blade moves to the open position, the abrasive particles move with it relative to the resilient seat and the packing. The abrasive particles get between the gate blade, the packing and the resilient seat and wear them out. As a result, the stock valve subject to intense abrasive wear.

SUMMARY OF THE INVENTION

In accordance with a first general aspect there is provided a knife gate valve.

The knife gate valve comprising:
a body having a chamber, a flow passage intersecting the chamber;
at least one seat located in the body motionlessly and having a sealing surface, an orifice which is aligned with the flow passage;
a gate having two parallel flat surfaces;
an actuator connected to the gate, providing rectilinear reciprocating motion in the chamber between an open position and a closed position relative to the sealing surface across the flow passage;
wherein the knife gate valve having the combination of a baseplate for each seat that is located in the gate and also movable jointly with the gate relative to the sealing surface and across the flow passage with a non-stretchable sealing belt surrounding each baseplate and having a locking section fixed to the body with the gate and baseplate are movable relative to the sealing belt and in the closed position;
the sealing belt is brought into contact by the baseplate on the sealing surface, forming a seal between the baseplate and the seat, wherein in the open position the sealing belt is removed from the sealing surface by the baseplate.

In one embodiment, the body comprises of a main body for the seat and a stuffing box with a packing, wherein stuffing box is fixed to the main body, the sealing belt has two belt ends which forming the locking section, and located in the body next to the seat from the side of the actuator.

In another embodiment, each sealing belt has an adjacent planar surface which is adjacent to the baseplate and an opposite remote planar surface with elastic properties.

In another embodiment, each baseplate is a separate item and is fixed in the gate, and the orifice is an extension of the flow passage.

In another embodiment, each baseplate is a single unit with the gate, and the orifice is an extension of the flow passage.

In another embodiment, each seat is a separate item and is fixed in the body, and the orifice is an extension of the flow passage.

In another embodiment, the seat is a single unit with the main body, and the orifice is an extension of the flow passage.

In another embodiment, the flow passage has two opposite connecting flanges, the gate has a scraper for each baseplate,
  each baseplate is a single unit with the gate, has two parallel flat base surfaces, two ends with roundings, there are two gaps, each between the gate and the said end,
  wherein,
  the base surfaces are parallel to the flat surfaces,
  one of the ends is an inner end and an opposite to an outer end, wherein the ends are perpendicular to the movement of the gate,
  each outer end is located on the actuator side,
  each inner end is located in the chamber,
  the sealing belt passes through the gaps and is positioned along the base surfaces and around the ends of the baseplate,
  the roundings are connected with the base surfaces, wherein
  when the gate moves, the inner end moves relative to the sealing surface and crosses the flow passage,
  the width of each the sealing belt is sufficient to completely cover of its corresponding sealing surface,
  the scraper of each baseplate located in the gap opposite the corresponding inner end, next to and across the sealing belt.

In another embodiment, the knife gate valve comprises a cleaning plate with a scraper for each baseplate, the flow passage has two opposite connecting flanges,
  the gate has the aperture of rectangular shape,
  the baseplate is separate item, and has two parallel flat base surfaces, two baseplate edges, two ends each with roundings wherein,
  the base surfaces are parallel to the flat surfaces, one of the ends is an inner end and an opposite is outer end,
  the baseplate is fixed in the aperture along of the baseplate edges,
  the ends are located in the aperture with gaps from the gate on opposite sides from the locking section in any position of the gate,
  the ends are perpendicular to the movement of the gate, located in an aperture with gaps from the gate and on opposite sides from the locking section at any gate position,
  the outer end is locates on the side of the actuator, the sealing belt passes through the gaps and is positioned along the base surfaces and around the ends, the width of the sealing belt is sufficient to completely cover the sealing surface,
  the cleaning plate fixed to the gate, the scraper is located opposite of the inner end next to and across the sealing belt, when the gate moves, the cleaning plate and the inner end move relative to the sealing surface and cross the said flow passage.

According to another general aspect, a knife gate is provided.

The knife gate valve comprising:
  a body having a chamber, a flow passage intersecting the chamber, an inlet flange and an opposite outlet flange;
  a seat located in the body motionlessly on the side of one of the flanges, the seat having a sealing surface and an orifice which is aligned with the flow passage and is an extension of it;
  a gate having two parallel flat surfaces, the outer ends and the inner end located in the chamber;
  an actuator which provided the gate a rectilinear reciprocating moving in the chamber between an open position and a closed position relative to the sealing surface across the flow passage;
  wherein the knife gate having the combination of roundings connecting the flat surfaces with the inner end and outer end with a connection of the actuator to the gate on either side of its outer end and with a gap between the gate and the actuator with a sealing belt having the belt edges;
  the sealing belt having belt edges and belt ends, and tightly fitting along the flat surfaces and around the inner end and outer end;
  wherein the gap is sufficient for the passage of the sealing belt with a cleaning plate fixed to the gate and having a connecting surface, an opposing cleaning surface, a scraper and an opposing cutting surface;
  the scraper locates next to and across from the sealing belt in front of the inner end with the body has a fixing surface to which the belt ends are fixed with in the closed position, the sealing belt is brought into contact with the sealing surface by means of the gate, forming a seal between the gate and the seat;
  and in the open position, the sealing belt is removed from the sealing surface by the gate.

In one embodiment, the inner end and the outer end are perpendicular to the movement of the gate, and the sealing belt is non-stretchable.

In one embodiment, the sealing belt is non-stretchable, has an adjacent planar surface which is adjacent to the gate, and an opposite remote planar surface with elastic properties.

In one embodiment, the knife gate valve further comprising a stuffing box with a packing, is fixed to the body behind the belt ends, wherein the sealing belt is in contact with the packing in any position of the gate.

In one embodiment, the knife gate valve further comprising clamps which are fixed in the body and tightly pressing the sealing belt along the belt edges to the gate.

In one embodiment, the cleaning plate positioned with a gap in relation to the sealing surface, the cutting surface has a toothed part forming in the cleaning plate several teeth with tooth bases and tooth ends, recesses between the teeth, the cleaning plate has channels made in its through the cleaning surface and directed from the recesses to the side of the scraper, wherein, the toothed part is the part of the cutting surface, is corresponded to the size of the orifice in the direction across the gate movement, is configured so that it is located relative to the orifice when the gate moves, the teeth expand from the tooth ends to the tooth bases.

In one embodiment, the knife gate valve further comprising a belt cleaner with a blade, that is fixed in the chamber on the other side from the sealing surface and the gate, wherein the belt cleaner is located in front of the packing, and the blade is located next to and across from the sealing belt.

In one embodiment, the inner end, the cutting surface, the scraper, are convex curved shape in plan, the outer end is straight segment in plan which is perpendicular to the gate movement, the sealing belt is made of elastic material, has flexible non-stretchable cords arranged longitudinally and fixed therein, wherein the said cords have cord ends which are fixed to the body together with the belt ends.

In one embodiment, the cleaning plate positioned with a gap in relation to the sealing surface, the cutting surface has a toothed part forming in the cleaning plate several teeth with tooth bases and tooth ends, recesses between the teeth, the cleaning plate has channels made in it through the cleaning surface and directed from the recesses to the side of the scraper, wherein the toothed part is the part of the cutting surface, is corresponded to the size of the orifice in the direction across the gate movement, is configured so that it is located relative to the orifice when the gate moves, the teeth expand from the tooth ends to the tooth bases.

DETAILED DESCRIPTION OF THE INVENTION

Figure 1:
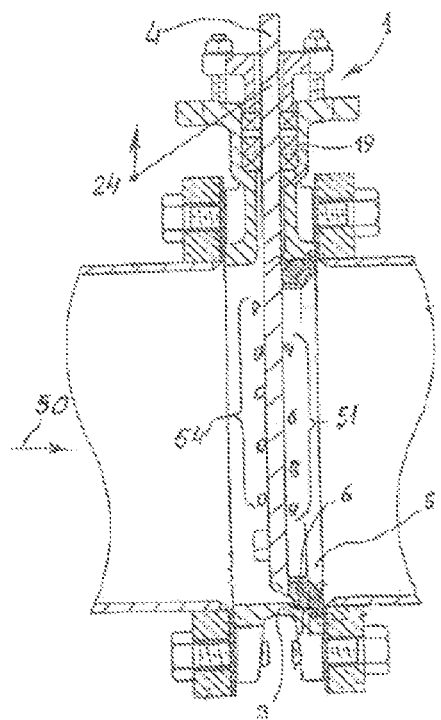
FIG. 1 shows a cross section of a prior art knife gate valve of Hideyuki Shimomura.

FIG. 1 (Prior Art) shows the vertical cross section of the knife gate valve of the US 2004/0124393A1 to Hideyuki Shimomura. The knife gate valve Prior Art comparting a main body 3 in which a gland packing 19 and a sealing structure 5 with a seat ring 6 are installed. Valve plate 4 movable installed in the main body 3.

Seat ring 6 and the gland packing 19 make contact with the valve plate 4 and act as seals to prevent fluid leakage through the valve 1. When knife gate valve Prior Art operated in the flow of material 50 containing abrasive particles and the valve plate 4 is in the closed position, the abrasive particles 51 and 54 are deposited onto the flat surfaces of the valve plate 4.

Then, when the valve plate 4 moves 24 to the open position, abrasive particles 51, 54 move 24 with it relative to the seat ring 6 and gland packing 19. The abrasive particles 51,54 get between the valve plate 4, the gland packing 19 and the seat ring 6 and wear them out. As a result, the knife gate valve Prior Art subject to intensive abrasive wear.

Figure 2:
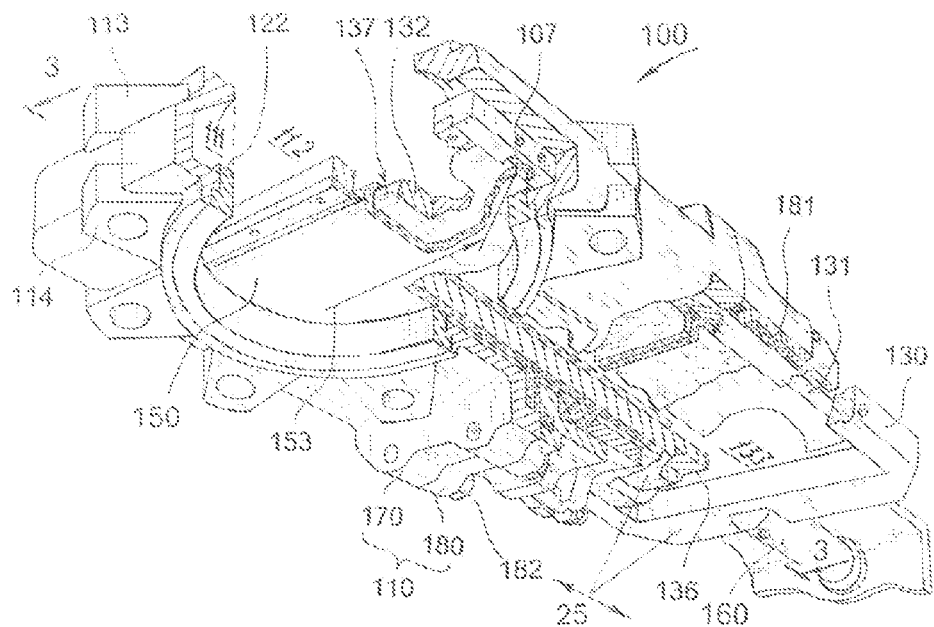
FIG. 2 shows a perspective view partially broken away of the unidirectional knife gate valve according to the present invention when the gate is in the intermediate position.

FIG. 2 shows a perspective view partially broken away of the unidirectional knife gate valve which is indicated generally by reference number 100 when the gate 130 is in the intermediate position in accordance with the present invention.

The knife gate valve 100 includes a body 110 with a chamber 111 and a flow passage 112 which intersecting the chamber 111.

The flow passage 112 has two opposite connecting flanges 113, 114.

In this example the body 110 includes a main body 170 and a stuffing box 180 with packing 181. The stuffing box unit 180 is fixed to the main body 170 by means bolts 182. The knife gate valve 100 includes a seat 120, see FIG. 2.

Figure 3:
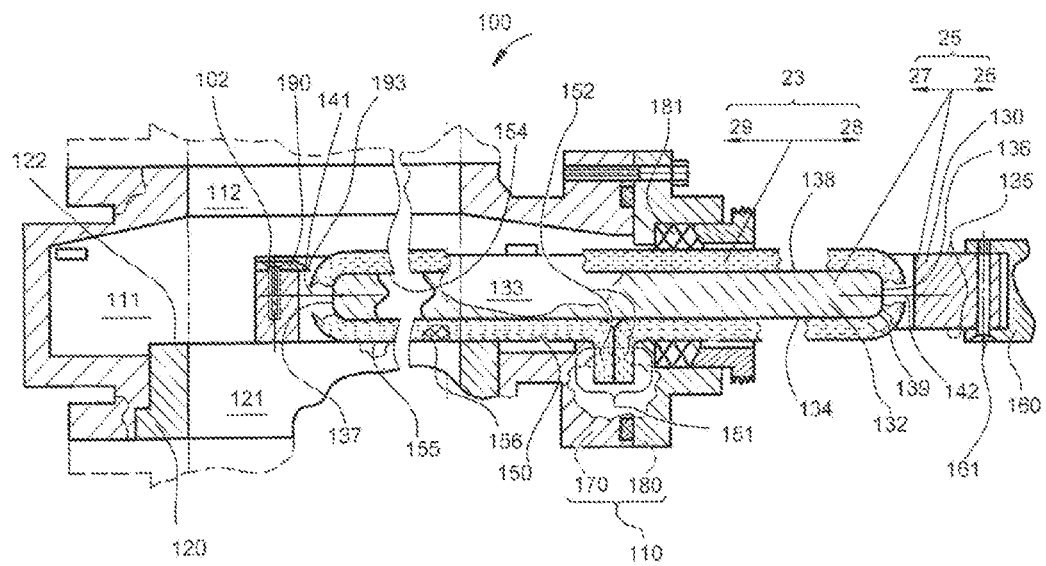
FIG. 3 is partial vertical cross section view of the valve of FIG. 2 taken along section line 3-3.

FIG. 3 is partial vertical cross section view of the knife gate valve of FIG. 2 taken along section line 3-3. The drawing is an illustration of a more detailed continuation of the description of the knife gate valve design.

The seat 120 locates in the body 110 motionlessly and has a sealing surface 122 and an orifice 121. The seat 120 is a separate item is fixed in the body 110, namely in the main body 170. The orifice 121 is aligned with the body flow passage 112 and is an extension of it.

The knife gate valve 100 includes a gate 130 which has two parallel flat surfaces 135. The gate 130 moveably enters to the body 110 from the side of the stuffing box unit 180. The knife gate valve 100 includes an activator 160. The activator 160 is connected to the gate 130 by the screw 161. The activator 160 provides a rectilinear reciprocating moving 25 of the gate 130 in the chamber 111 between an open position and a closed position (this gate positions are not shown). In the drawing the movement to the open position is indicated by position 26 and the movement to the closed position by position 27. The gate 130 moving relative to the sealing surface 122 and across the flow passage 112.

The gate 130, see FIGS. 2 and 3, has an aperture 133 of rectangular shape. The knife gate valve 100 includes a baseplate 132 which is a separate item. The baseplate 132 locates in the gate 130 and movable 25 jointly with it relative to the sealing surface 122 and across the flow passage 112. The baseplate 132, see FIG. 3, has two parallel flat base surfaces 134, 138, two opposite ends 136, 137 each with roundings 139. The roundings 139 are connected with the base surfaces 134, 138. The base surfaces 134, 138 are parallel to the flat surfaces 135.

One of the ends is an inner end 137 and an opposite is an outer end 136. The ends 136,137, see FIG. 2. The baseplate 132 has two baseplate edges 131, is fixed in the aperture 133 along of the two baseplate edges 131 by means of screws 107. The ends 136, 137 are perpendicular to the movement 25 of the gate 130, see FIG. 2, located in the aperture 133 with gaps 141, 142 from the gate 130. The outer end 136 locates on the side of the actuator 160. As will be understood by those of skill in the art, other fixation options of the baseplate in the gate can be applied. The baseplate may be formed of suitable material, such as a stainless steel, or brass, bronze, cast iron, plastic etc.

The knife gate valve 100 includes a sealing belt 150 which is non-stretchable. The sealing belt 150 has a locking section 151 fixed to the body 110. The sealing belt 150 has two belt ends 152. The locking section 151 is formed by these belt ends 152. The belt ends 152 locate in the body 110 next to the seat 120 from the side of the actuator 160.

In the knife gate valve 100 the sealing belt 150 has an adjacent planar surface 154 which is adjacent to the baseplate 132, an opposite remote planar surface 155. The sealing belt 150 has elastic properties 156 on the side of the remote planar surface 155.

The sealing belt 150 passes through the gaps 141, 142 and is positioned along the base surfaces 134,138 and around the ends 136, 137. The roundings 139 provides that the sealing belt 150 is smoothly wrapped around the ends 136, 137. The sealing belt 150 surrounds the baseplate 132 tightly. The ends 136, 137 are located on opposite sides from the locking section 151 in any position of the gate 130.

The gate 130 and the baseplate 132 are movable relative to the sealing belt 150. The baseplate 132 transports 23 the sealing belt 150, one of the transport direction being indicated by position 28 and the other by position 29. The sealing belt 150 and the baseplate 132 are configured so that when the gate 130 is moved 27 to the closed position, the sealing belt 150 is brought into contact with the sealing surface 122 by means of the baseplate 132, forming a seal between the baseplate 132 and the seat 120. When the gate 130 is moved 26 to the open position, the sealing belt 150 is removed from the sealing surface 122 by the baseplate 132.

The packing 181 seals the gate 130 and the sealing belt 150 in the body 110. The width 153 of the sealing belt 150, see FIG. 2, is sufficient to completely cover the sealing surface 122. The knife gate valve 100, see FIG. 3, includes a cleaning plate 190 fixed to the gate 130 by means of screws 102. The cleaning plate 190 has a scraper 193 located opposite of the inner end 137 next to and across the sealing belt 150. When the gate 130 moves 25 the cleaning plate 190 and the inner end 137 move relative to the sealing surface 122 and crossing the flow passage 112.

Figure 4:
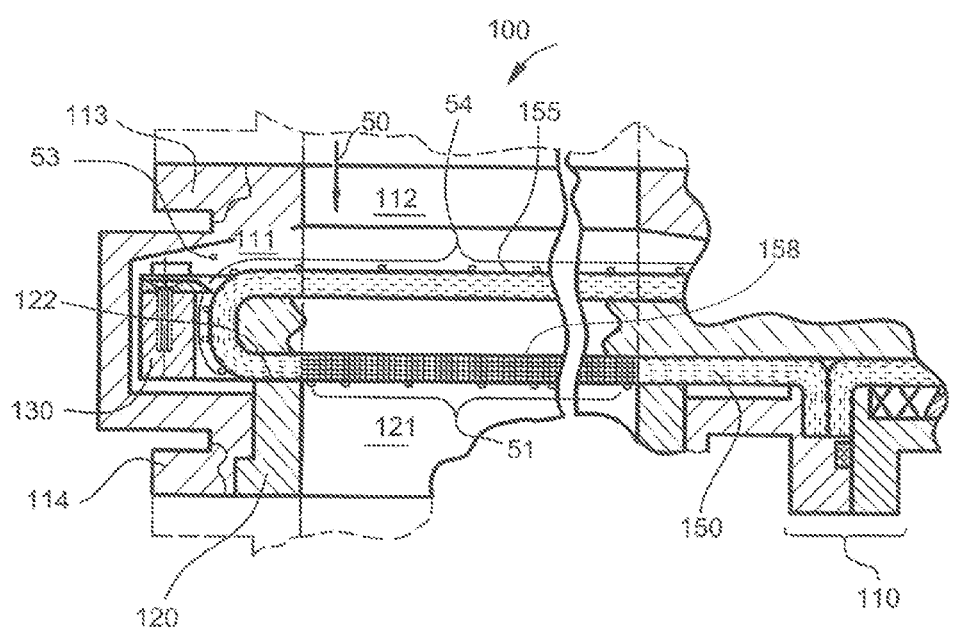
FIG. 4 shows part of the cross section of the valve of FIG. 3 when its operation in the flow of material containing abrasive particles. The gate is in the closed position.
Figure 5:
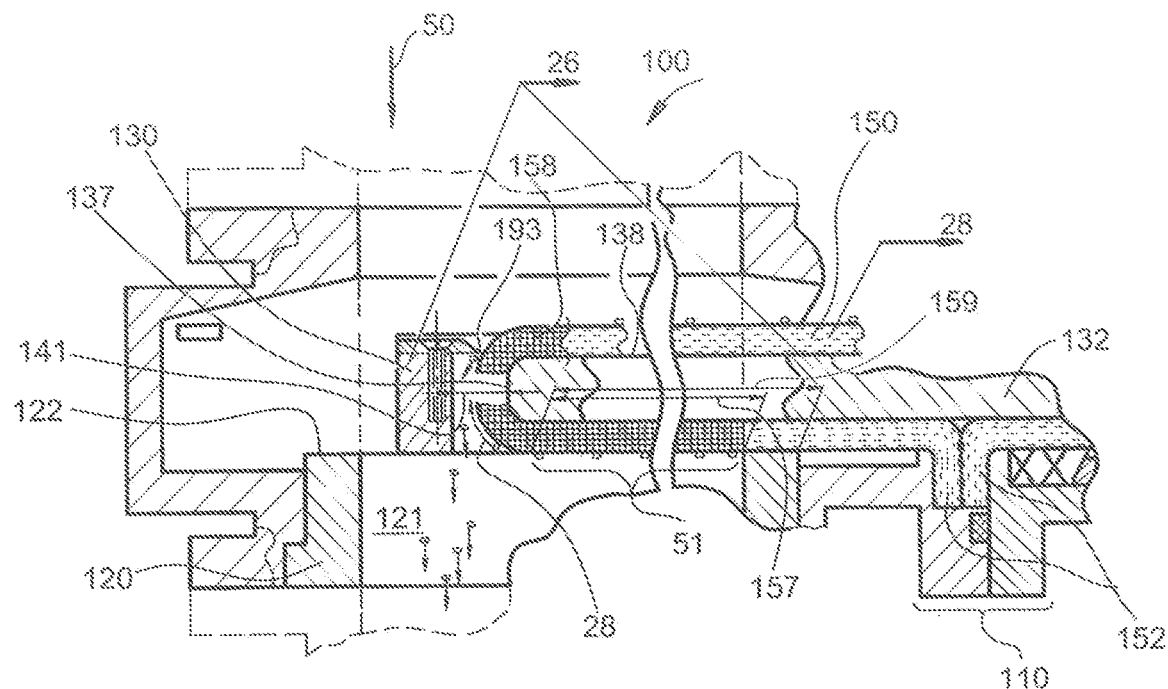
FIG. 5 shows part of the cross section of the valve of FIG. 3 when its operation in the flow of material containing abrasive particles. The gate is moved to the open position.
Figure 6:
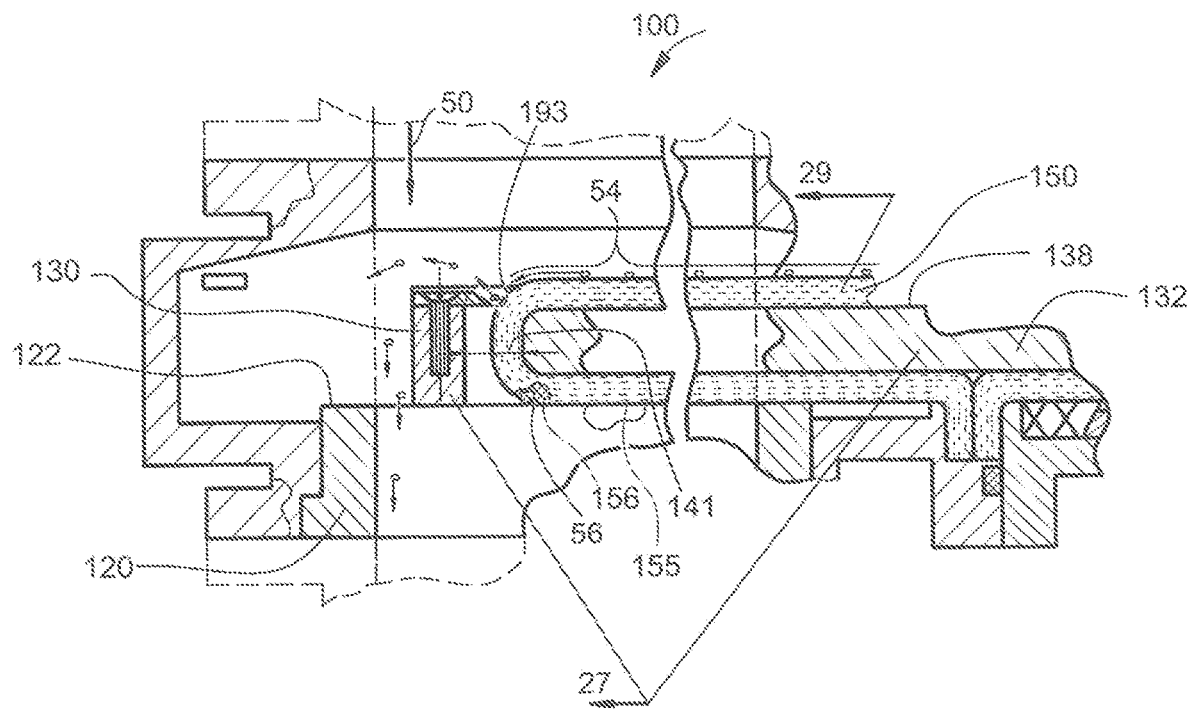
FIG. 6 shows part of the cross section of the valve of FIG. 3 when its operation in the flow of material containing abrasive particles. The gate is moved to the closed position.

FIGS. 4-FIG. 6 show part of the cross section of the knife gate valve 100 of FIG. 3 when its operation in the flow of material 50 containing abrasive particles.

FIG. 4 shows part of the cross section of the knife gate valve 100 of FIG. 3 when its operation in the flow of material 50 containing abrasive particles. The gate 130 is in the closed position. The body 110 is attached to the process equipment (not shown in the drawing) by means of flanges 113, 114. The gate 130 prevents the flow of material 50 through the knife gate valve 100. The sealing belt 150 is brought into contact with the sealing surface 122 of the seat 120.

The abrasive particles 53 (one abrasive particle is conventionally shown) from the process equipment through the flow passage 112 get in the chamber 111. Some of them designated by position 54 are deposited on the sealing belt 150 located in the chamber 111. The abrasive particles 51 are deposited on the sealing belt 150 from the process equipment which connected to the flange 114. The abrasive particles 51 enter through the orifice 121 on the section 158 (it is shaded) of the sealing belt 150, which is in the orifice 121.

When the gate 130 is moved 26 to the open position, see FIG. 5, the baseplate 132 removes the sealing belt 150 from the sealing surface 122 and transports 28 the section 158 (it is shaded) of the sealing belt 150 around of the inner end 137 to the base surface 138. The baseplate 132 transports 28 the section 158 in the gap 141 relative to the scraper 193 which locates opposite of the inner end 137 next to and across the sealing belt 150. The abrasive particles 51 which are deposited on the sealing belt section 158 are transported 28 and displaced from the sealing belt 150 by the scraper 193 into the flow of material 50.

The belt ends 152 are fixed to the body 110. The sealing belt 150 surrounds the baseplate 132 tightly. The seat 120 is fixed in the body 110. As will be apparent to those of skill in the art, when the baseplate 132 moving 26 jointly with the gate 130 relative to the sealing surface 122, there is no linear motion between the seat 120 and the sealing belt section 159, which is in contact with the sealing surface 122 of the seat 120.

The abrasive particles 51 on the portion 157 of the sealing belt section 159 located in the orifice 121 make no linear motion relative to the seat 120. Therefore, abrasive particles 51 do not abrasive wear the seat 120. As result, the seat 120 abrasive wear is reduced. (in existing valves, the gate with abrasive particles on flat surfaces moves relative to the seat, as result the gate and the seat are exposed to abrasive wear).

When the gate 130 is moved 27 to the closed position, see FIG. 6, the baseplate 132 moves 27 with it and transports 29 the sealing belt 150 from the base surface 138 into the gap 141. The sealing belt 150 is in the flow of material 50 containing abrasive particles. Some the abrasive particles 54 deposit on the of the sealing belt 150 are transported 29 with it to the gap 141. The abrasive particles 54 displaced from the sealing belt 150 by the scraper 193 into the flow of material 50. The baseplate 132 sets the cleaned sealing belt 150 on the sealing surface 122. The clean sealing belt 150 forms a reliable seal between the baseplate 132 and the seat 120.

Some the abrasive particles 56 (one abrasive particle is conventionally shown), get stuck between the seat 120 and the remote planar surface 155 of the sealing belt 150. The sealing belt 150 has elastic properties 156 on the side of the remote planar surface 155. The abrasive particles 56 are pressed into the sealing belt 150 by the seat 120. This eliminates the need to break the stuck abrasive particle 56 to continue the movement of the gate 130. As a result, abrasion wear of the seat 120 is reduced.

Figure 7:
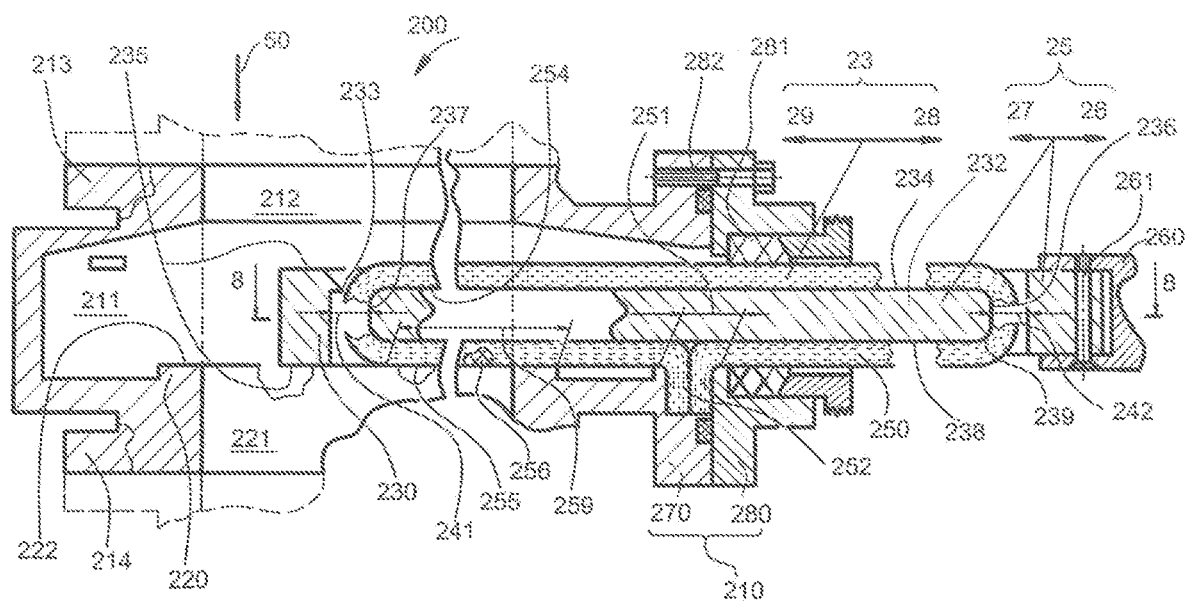
FIG. 7 shows vertical cross section of the unidirectional knife gate valve when the gate is in an intermediate position.

FIG. 7 shows vertical cross section of the unidirectional knife gate valve, which is generally indicated by reference number 200 when the gate 230 is in an intermediate position in accordance with the present invention.

The knife gate valve 200 includes a body 210 with a chamber 211 and a flow passage 212 which intersecting the chamber 211. The flow passage 212 has two opposite connecting flanges 213, 214.

In this example the body 210 includes a main body 270 for the seat 220 and a stuffing box 280 with packing 281. The stuffing box unit 280 is fixed to the main body 270 by means bolts 282. The knife gate valve 200 includes a seat 220 which is a single unit with the main body 270. The seat 220 has a sealing surface 222 an orifice 221. The orifice 221 is aligned with the flow passage 212 and is an extension of it. The knife gate valve 200 includes a gate 230 which has two parallel flat surfaces 235.

The knife gate valve 200 includes an activator 260. The activator 260 is connected to the gate 230 by the screw 261. The activator 260 provides a rectilinear reciprocating moving 25 of the gate 230 in the chamber 211 between an open position and a closed position (this gate positions are not shown). In the drawing the movement to the open position is indicated by position 26 and the movement to the closed position by position 27. The gate 230 moving relative to the sealing surface 222 and across the flow passage 212. The baseplate 232 locates in the gate 230 and movable jointly with it relative to the sealing surface 222 and across the flow passage 212.

The baseplate 232 is a single unit with the gate 230. The baseplate 232 has two parallel flat base surfaces 234, 238, two ends 236, 237 with roundings 239. The roundings 239 are connected with the base surfaces 234, 238. The base surfaces 234, 238 are parallel to the flat surfaces 235. One of the ends is an inner end 237 and an opposite is outer end 236. The ends 236, 237 are perpendicular to the movement 25 of the gate 230, see FIG. 7)8.

Figure 8:
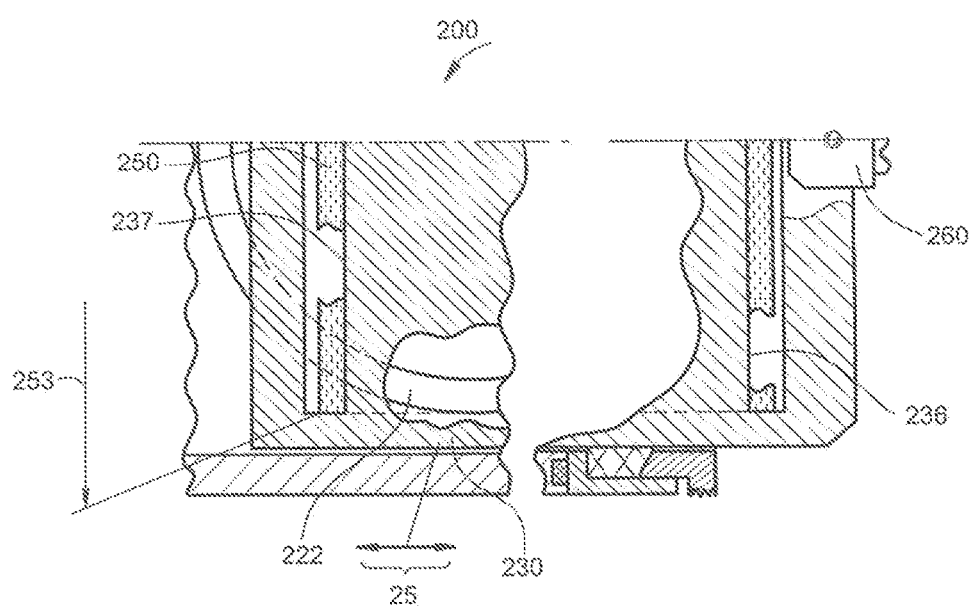
FIG. 8 is partial vertical cross section view of the valve of FIG. 7 taken along section line 8-8.

FIG. 8 is partial vertical cross section view of the knife gate valve of FIG. 7 taken along section line 8-8.

The outer end 236 is located on the actuator 260 side. The inner end 237, see FIG. 7, locates in the chamber 211.

There are two gaps 241, 242, each between the gate 230 and the end 236, 237.

The knife gate valve 200 includes a sealing belt 250 which is non-stretchable. The sealing belt 250 has a locking section 251 fixed to the body 210. The sealing belt 250 has two belt ends 252 which formed the locking section 251. The ends 236, 237 locate on opposite sides from the locking section 251 in any position of the gate 230.

The belt ends 252 locate in the body 210 next to the seat 220 from the side of the actuator 260. The sealing belt 250 passes through the gaps 241, 242 and is positioned along the base surfaces 234, 238 and around the ends 236, 237. The roundings 239 provides that the sealing belt 250 is smoothly wrapped around the ends 236, 237. The sealing belt 250 surrounds the baseplate 232 tightly.

In the knife gate valve 200 the sealing belt 250 has an adjacent planar surface 254 which is adjacent to the baseplate 232, an opposite remote planar surface 255. The sealing belt 250 has elastic properties 256 on the side of the remote planar surface 255.

The gate 230 has a scraper 233. The scraper 233 locates in the gap 241 opposite its corresponding the inner end 237, next to and across the sealing belt 250. When the gate 230 moves 25, the inner end 237 move 25 relative to the sealing surface 222 and crossing the flow passage 212.

The gate 230 and the baseplate 232 are movable relative to the sealing belt 250. The baseplate 232 transports 23 the sealing belt 150, one of the transport direction being indicated by position 28 and the other by position 29.

The sealing belt 250 and the baseplate 232 are configured so that when the gate 230 is moved 27 to the closed position, the sealing belt 250 is brought into contact with the sealing surface 222 by means of the baseplate 232, forming a seal between the baseplate 232 and the seat 220. When the gate 230 is moved 26 to the open position, the sealing belt 250 is removed from the sealing surface 222 by the baseplate 232. The width 253 of the sealing belt 250, see FIG. 7)8, is sufficient to completely cover the sealing surface 222.

In this option the knife gate valve 200 is similar in construction to the previously shown knife gate valve 100. The main difference is that in the previous knife gate valve 100, see FIG. 2 and FIG. 3:
  the seat 120 is a separate item fixed in the body 110;
  the gate 130 has the aperture 133;
  the baseplate 132 is fixed in the aperture 133;
  the knife gate valve 100 has the cleaning plate 190 with the scraper 193. The cleaning plate 190 is fixed to the gate 130.
In version of the knife gate valve 200, see FIG. 7:
  the seat 220 is a single unit with the main body 270;
  the gate 230 has two gaps 241, 242 through the flat surfaces 235;
  the baseplate 230 is a single unit with the gate 230.

The gate 230 has a scraper 233. This design reduces the number of parts and simplifies the design of the knife gate valve. It is not necessary to fix an additional element in the gate and in the body.

But as in the previous one, in this version the sealing belt 250 surrounds the baseplate 232 tightly, there is no linear motion between the seat 220 and the sealing belt section 259, which is in contact with the sealing surface 222 of the seat 220. Also the scraper 233 located next to and across the sealing belt 250 in front the inner end 237. The sealing belt 250 has elastic properties 256 on the side of the remote flat surface 255. Therefore, previous description of operation in the flow of material 50 containing abrasive particles is similar and the resulting positive properties are valid for this version as well.

Figure 9:
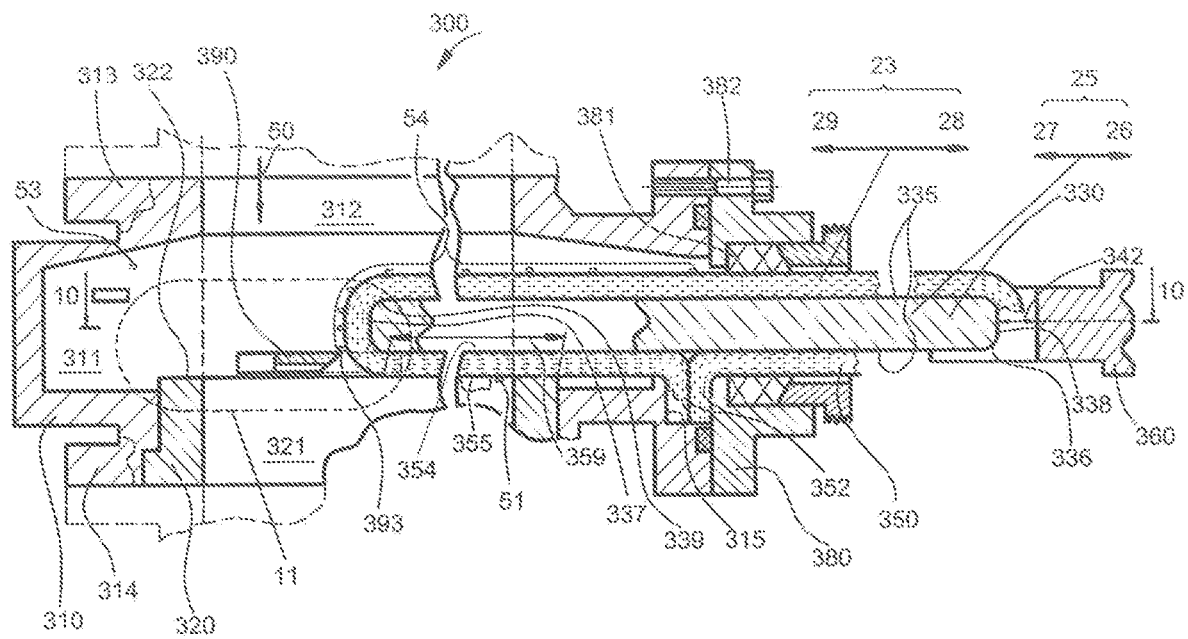
FIG. 9 shows vertical cross section of the unidirectional knife gate valve according to the present invention when the gate is in an intermediate position. The drawing is an illustration of the knife gate valve operation in the flow of material containing abrasive particles.

FIG. 9 shows vertical cross section of the unidirectional knife gate valve, which is generally indicated by reference number 300 when the gate 330 is in an intermediate position in accordance with the present invention. The drawing is an illustration of the knife gate valve design and operation of it in the flow of material 50 containing abrasive particles. The knife gate valve 300 has a body 310 with a chamber 311 and a flow passage 312 which intersecting the chamber 311. The flow passage 312 has an inlet flange 313 and an opposite outlet flange 314 for attached to the process equipment (which is not shown). The knife gate valve 300 includes a seat 320. The seat 320 is located in the body 310 motionlessly on the outlet flange 314 side. The seat 320 is a separate item and fixed in the body 310. The seat 320 has a sealing surface 322 and an orifice 321. The orifice 321 is aligned with the flow passage 312 and is an extension of it.

In the proposed knife gate valve as well as in existing knife gate valves the seat and the body may have different designs and this is not the subject of the invention. In particular, the seat may be made as one-piece with the body.

The knife gate valve 300 includes a gate 330. The gate 330 has two parallel flat surfaces 335, an inner end 337 with roundings 339, an opposite outer end 338 with roundings 336. The rundings 336, 339 are connected with the flat surfaces 335. The inner end 337 is locates in the chamber 311.

The knife gate valve 300 includes an activator 360.

Figure 10:
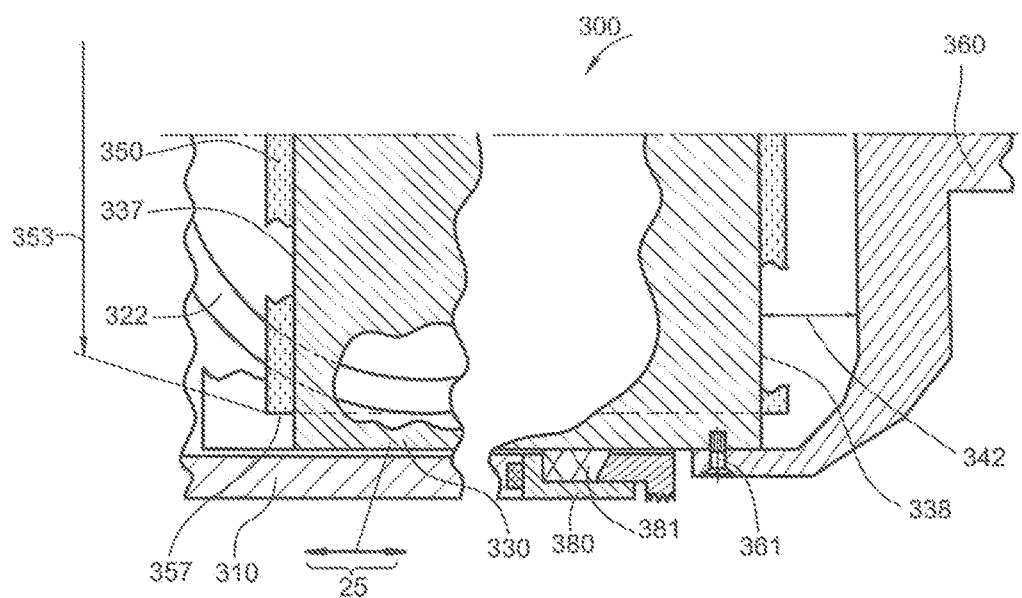
FIG. 10 is horizontal cross section view of the knife gate valve of FIG. 9 taken along section line 10-10.

The activator 360, see FIG. 10, is connected to the gate 330 by the screws 361 on either side of its outer end 338, and with gap 342 between the actuator 360 and gate 330.

FIG. 10 is horizontal cross section view of the knife gate valve of FIG. 9 taken along section line (10-10). The activator 360 provides the gate 330 a rectilinear reciprocating moving 25 in the chamber 311, see FIG. 9. The gate 330 moves 25 between an open position and a closed position, (this gate positions are not shown). In the drawing the movement to the open position is indicated by position 26 and the movement to the closed position by position 27. The inner end 337 and the outer end 338, see FIG. 10, are perpendicular to the movement 25 of the gate 330. The gate 330, see FIG. 9, moves 25 relative to the sealing surface 322 and across to the flow passage 312.

The knife gate valve 300 includes a sealing belt 350 which is non-stretchable.

The sealing belt 350 has belt ends 352, belt edges 357, see FIG. 10, an adjacent planar surface 354, see FIG. 9, which is adjacent to the gate 330, an opposite remote planar surface 355. The sealing belt 350 has elastic properties 356 on the side of the remote flat surface 355. The sealing belt 350 is tightly fitted along the flat surfaces 335 around the inner end 337 and the outer end 338. The gap 342 is sufficient for the sealing belt 350 to pass through.

The body 310 has a fixing surface 315 located from the side of the seat 320 between it and the actuator 360. The belt ends 352 are fixed to the fixing surface 315. The inner end 337 and the outer end 338 are located on opposite sides from the fixing surface 315 in any position of the gate 330.

The gate 330 is movable relative to the sealing belt 350 and transports 23 the sealing belt 350, one direction of transport being indicated by position 28 and the other by position 29. The sealing belt 350 and the gate 330 are configured so that when the gate 330 moves 27 to the closed position, the sealing belt 350 is brought into contact with the sealing surface 322 by means of the gate 330, forming a seal between the gate 330 and the seat 320. When the gate 330 moves 26 to the open position, the sealing belt 350 is removed from the sealing surface 322 by the gate 330. The width 353 of the sealing belt 350, see FIG. 10, is sufficient to completely cover the sealing surface 322.

Figure 11:
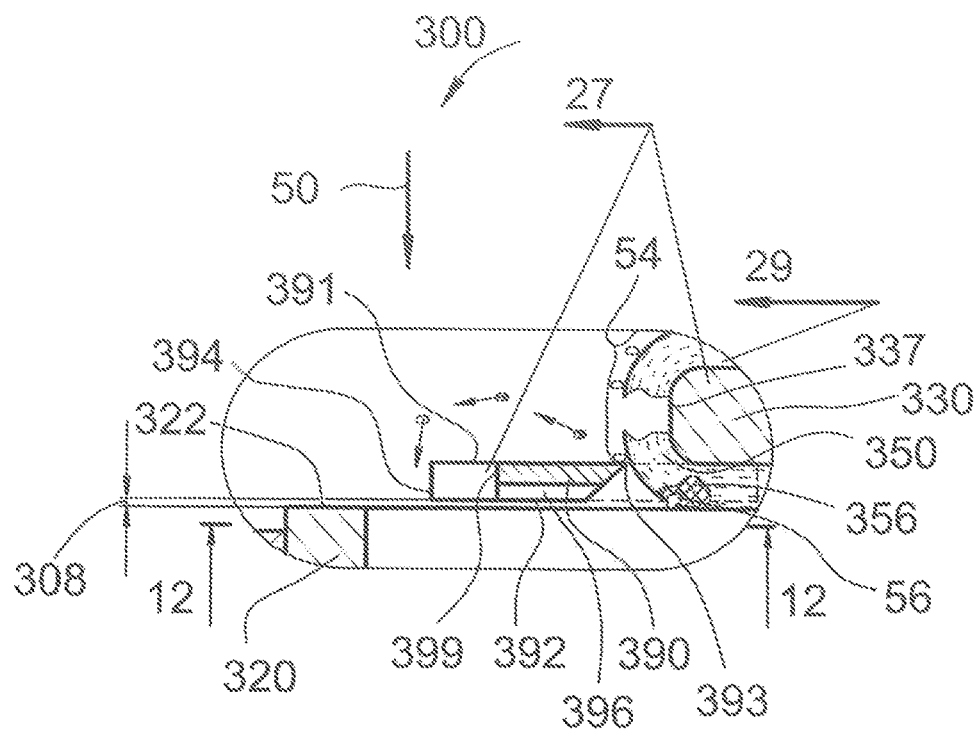
FIG. 11 is an enlarged view of the knife gate valve part of the FIG. 9, corresponding to section 11 of FIG. 9.

The knife gate valve 300 includes a stuffing box unit 380 with a packing 381 which seals the gate 330 and the sealing belt 350 in the body 310, see FIG. 9 and FIG. 10. The stuffing box unit 380, see FIG. 9, is fixed to the body 310 behind of the belt ends 352 by means of bolts 382. The sealing belt 350 is in contact with the packing 381 in any position of the gate 330. The knife gate valve 300 includes a cleaning plate 390. The design of the cleaning plate 390 is better seen in the FIG. 11. FIG. 11 is an enlarged view of the knife gate valve part of the FIG. 9, corresponding to section 11 of FIG. 9.

The cleaning plate 390 has a connecting surface 391, an opposite cleaning surface 392, a scraper 393 and an opposite cutting surface 394. The cutting surface 394 intersects the cleaning surface 392. The cleaning plate 390 is fixed to the gate 330 by means of screws 302, see FIG. 12.

Figure 12:
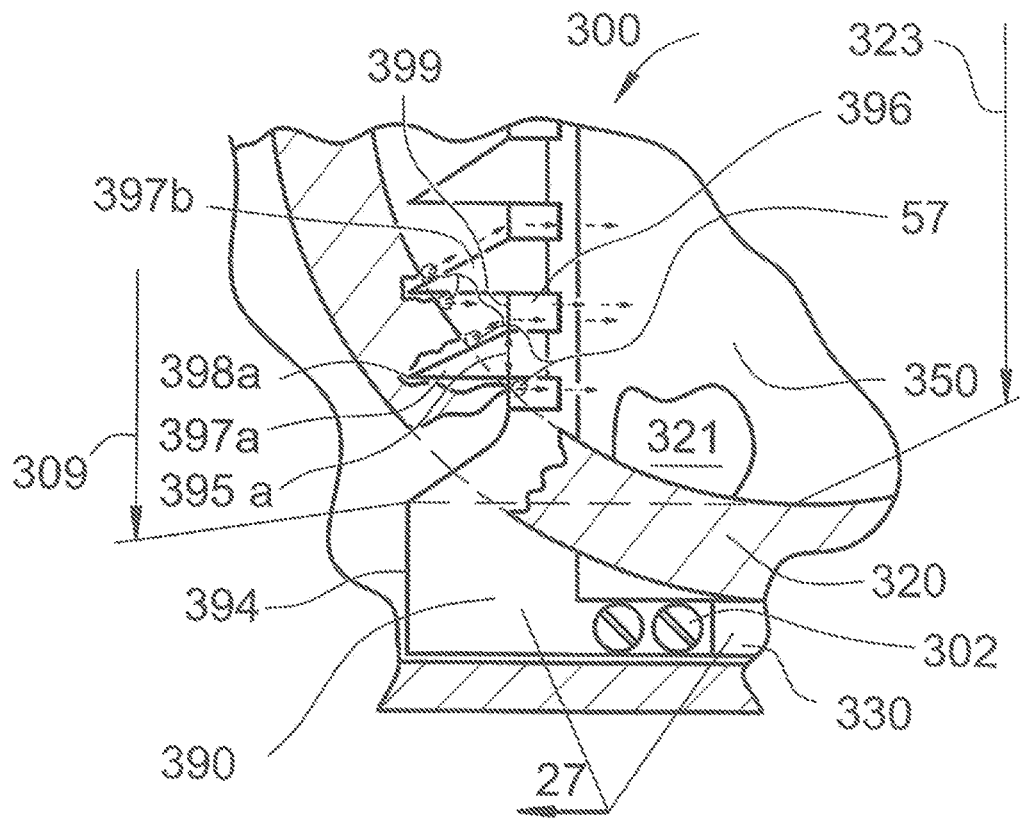
FIG. 12 is horizontal cross section view of the knife gate valve of FIG. 11 taken along section line 12-12.

FIG. 12 is horizontal cross section view of the knife gate valve of FIG. 11 taken along section line 12-12. The cleaning surface 392, see FIG. 11, locates opposite the sealing surface 322. The scraper 393 locates next to and across the sealing belt 350 in front the inner end 337. When the gate 330 moves 25, see FIG. 9, the cleaning plate 390 and the inner end 337 move 25 relative to the sealing surface 322 and crossing the flow passage 312.

This option isolates the gate from contact with the seat, which reduces abrasive wear of the gate. Only the cleaning plate is made of abrasion-resistant material.

In this options the knife gate valve 300 is similar in construction to the previously shown knife gate valve 100. The main difference is that in the previous knife gate valve 100, see FIG. 2 and FIG. 3, the baseplate 132 is fixed in the aperture 133 of the gate 130 and the sealing belt 150 surrounds this baseplate 132. In version of the knife gate valve 300, see FIG. 9, there is no baseplate. The sealing belt 350 is tightly fitted along the flat surfaces 335 around the inner end 337 and the outer end 338.

This design reduces the number of parts and simplifies the design of the knife gate valve. It is not necessary to fix an additional element in the gate.

But as in the previous one, in this version there is no linear motion between the seat 320 and the sealing belt section 359, which is in contact with the sealing surface 322 of the seat 320. Also the scraper 393 located next to and across the sealing belt 350 in front the inner end 337. The sealing belt 350 has elastic properties 356 on the side of the remote flat surface 355. Therefore, previous description of operation in the flow of material 50 containing abrasive particles is similar and the resulting positive properties are valid for this version as well.

When the gate 330 moves 26 to the open position, the abrasive particles 51 (one abrasive particle is conventionally shown) which have deposited on the sealing belt 350 on the seat orifice 321 side make no linear motion relative to the seat 320 and do not expose it to abrasive wear. As in the previous one, in this version, when the gate 330 transports 28 the sealing belt 350, the abrasive particles 51 are displaced (it is not shown) from the sealing belt 350 by the scraper 393. When the gate 330 is moved 27 to the closed position, see FIG. 11, some the abrasive particles 56 (one abrasive particle is conventionally shown) get stuck between the seat 320 and the sealing belt 350.

The abrasive particles 56 are pressed into the elastic part 356 of the sealing belt 350. This eliminates the need to break the stuck abrasive particle 56 to continue the movement 27 of the gate 330. As result, the seat 320 abrasive wear is reduced.

The abrasive particles 53 (one abrasive particle is conventionally shown), see FIG. 9, locate in the chamber 311, some of them designated by position 54 are deposited on the sealing belt 350. When the gate 330 is moved 27 to the closed position, see FIG. 11, it transports 29 the sealing belt 350 and the abrasive particles 54 relative the scraper 393. The abrasive particles 54 are displaced by the scraper 393 from the sealing belt 350 and carried away by the flow of material 50 out of the knife gate valve 300. The gate 330 sets the cleaned sealing belt 350 on the sealing surface 322. The clean sealing belt 350 forms a reliable seal between the gate 330 and the seat 320.

Moreover, in this embodiment of the knife gate valve 300, the cleaning plate 390 is positioned with a gap 308 in relation to the sealing surface 322. The cutting surface 394, see FIG. 12, has a toothed part 309. The toothed part 309 is the part of the cutting surface 394, is corresponded to the size 323 of the orifice 321 in the direction across the gate 330 movement 27.

The toothed part 309 is configured so that it is located relative to the orifice 321 when the gate 330 moves 27. Toothed part 309 forming several teeth in the cleaning plate 390, two of them (for description) are marked with position 397a, and 397b. Tooth 397a has tooth end 398a and a tooth base 395a. Tooth 397a expand from the tooth end 398a to the tooth base 395a. There is a recess 399 between the teeth 397a and 397b. Cleaning plate 390 has channels 396, see FIG. 11 and FIG. 12, directed from the recesses 399 to the side of the scraper 393. The channels 396, see FIG. 11 is made in the cleaning plate 390 through the cleaning surface 392.

The knife gate valve 300 operates in the flow of material 50 containing abrasive particles. When the gate 330 and the cleaning plate 390, see FIG. 12, moving 27 to the closed position, teeth of the cleaning plate 390 begin to overlap the orifice 321 (at this point, teeth 397a and 397b). Some of the abrasive particles (indicated by position 55) end up in contact between the seat 320 and the teeth 397a and 397b.

When the gate 330 moves 27, mutual position of the cleaning plate 390 and the abrasive particles 57 change. The particles 57 end up in the channels 396 and further on the surface of the sealing belt 350. On the drawing the dashed arrows show the trajectory of position of the abrasive particles 57 relative to the cleaning plate 390 during its movement 27. The cleaning plate 390 and the abrasive particles 57 have an opportunity to change their mutual position, so the abrasive particles 57 do not get stuck between the seat 320 and the cleaning plate 390, therefore do not expose them to abrasive wear (in existing valves, abrasive particles get stuck between the seat and the gate, exposing them to abrasive wear). The gap 308, see FIG. 11, between the cleaning plate 390 and the sealing surface 322 eliminates their contact when the cleaning plate 390 moves 27. As a result, the cleaning plate 390 and its teeth are not in contact with the seat 320 in motion and do not expose it to wear.

Figure 13:
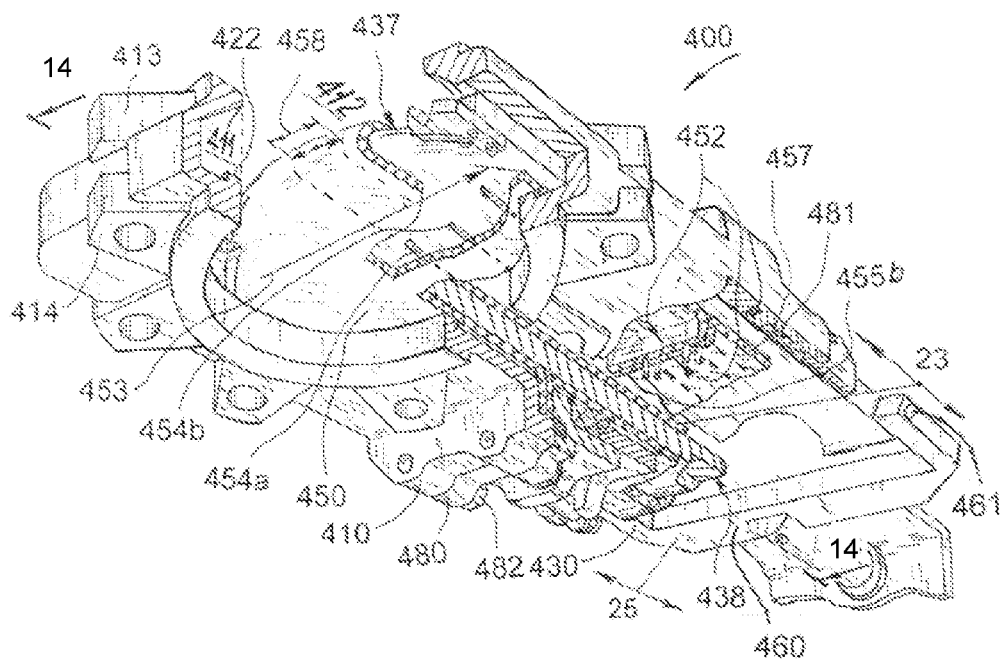
FIG. 13 shows a perspective view partially broken away of the unidirectional knife gate valve when the gate is in the intermediate position.

FIG. 13 shows a perspective view partially broken away of the unidirectional knife gate valve which is indicated generally by reference number 400 when the gate 430 is in the intermediate position in accordance with the present invention.

The knife gate valve 400 includes a body 410 with a chamber 411 and a flow passage 412 which intersecting the chamber 411. The flow passage 412 has an inlet flange 413 and an opposite outlet flange 414 for attached to the process equipment (which is not shown).

Figure 14:
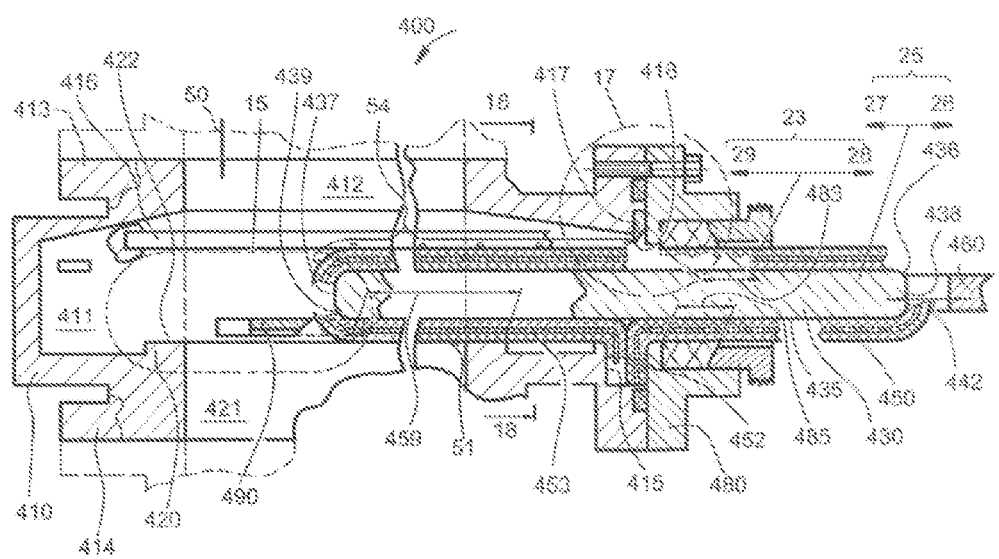
FIG. 14 shows vertical cross section of the unidirectional knife gate valve FIG. 13 taken along section line 14-14. The drawing is an illustration of the knife gate valve design and operation of it in the flow of material containing abrasive particles.

The knife gate valve 400 includes a seat 420, see FIG. 14. FIG. 14 shows vertical cross section of the knife gate valve of FIG. 13 taken along section line 14-14. The drawing is an illustration of a more detailed continuation of the description of the knife gate valve design and operation of it in the flow of material 50 containing abrasive particles.

The seat 420 is a single unit with the body 410. The seat 420 has a sealing surface 422 and an orifice 421. The orifice 421 is aligned with the flow passage 412 and is an extension of it. In the proposed knife gate valve as well as in existing knife gate valves the seat and the body may have different designs and this is not the subject of the invention.

The knife gate valve 400 includes a gate 430. The gate 430 has two parallel flat surfaces 435, an inner end 437 with rounding's 439, an opposite outer end 438 with roundings 436. The roundings 436, 439 are connected with the flat surfaces 435 The inner end 437 is locates in the chamber 411.

The knife gate valve 400 includes an activator 460.

The activator 460, see FIG. 13, is connected to the gate 430 by the screws 461 on either side of its outer end 438, and with a gap 442 between the actuator 460 and gate 430, see FIG. 14.

The knife gate valve 400 includes a sealing belt 450. The sealing belt 430 has belt ends 452 and belt edges 457. The sealing belt 450, see FIG. 14, is tightly fitted along the flat surfaces 435 around the inner end 437 and the outer end 438. The gap 442 is sufficient for the sealing belt 450 to pass through.

The body 410 has a fixing surface 415 located from the side of the seat 420 between it and the actuator 460. The belt ends 452 are fixed to the fixing surface 415. The inner end 437 and the outer end 438 are located on opposite sides from the fixing surface 415 in any position of the gate 430.

The activator 460 provides the gate 430 a rectilinear reciprocating moving 25 in the chamber 411. The gate 430 moves 25 between an open position and a closed position, (this gate positions are not shown). In the drawing the movement to the open position is indicated by position 26 and the movement to the closed position by position 27. The gate 430 moves 25 relative to the sealing surface 422 and across to the flow passage 412. The outer end 438, see FIG. 13, is perpendicular to the gate 430 movement 25.

The gate 430 is movable relative to the sealing belt 450 and transports 23 the sealing belt 450, one direction of transport being indicated by position 28 and the other by position 29. The sealing belt 450 and the gate 430 are configured so that when the gate 430 moves 27 to the closed position, the sealing belt 450 is brought into contact with the sealing surface 422 by means of the gate 430, forming a seal between the gate 430 and the seat 420. When the gate 430 moves 26 to the open position, the sealing belt 450 is removed from the sealing surface 422 by the gate 430.

The width 453 of the sealing belt 450, see FIG. 13, is sufficient to completely cover the sealing surface 422.

The knife gate valve 400 includes a stuffing box unit 480 with a packing 481 which seals the gate 430 and the sealing belt 450 in the body 410. The stuffing box unit 480 is fixed to the body 410 behind of the belt ends 452 by means of bolts 482. The sealing belt 450 is in contact with the packing 481 in any position of the gate 430. The knife gate valve 400, see FIG. 14, includes a cleaning plate 490.

Figure 15:
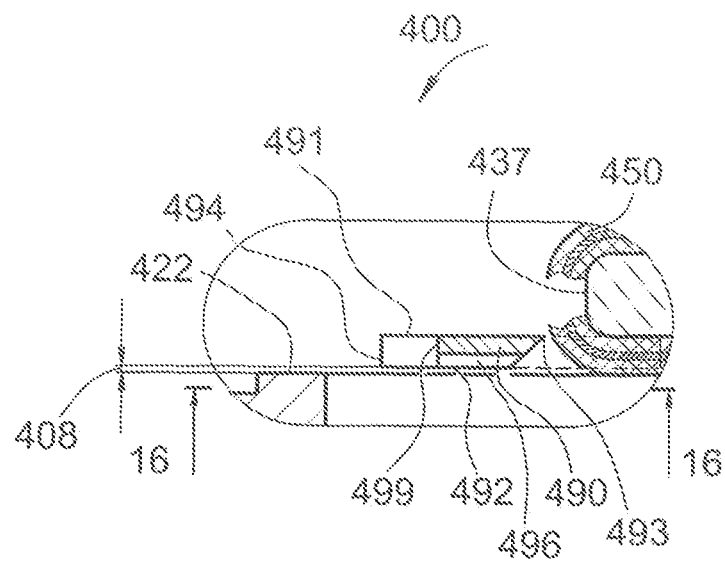
FIG. 15 is an enlarged view of the knife gate valve part of the FIG. 14, corresponding to section 15 of FIG. 14.

The design of the cleaning plate 490 is better seen in the FIG. 15. FIG. 15 is an enlarged view of the knife gate valve part of the FIG. 14 corresponding to section 14 of the FIG. 14.

The cleaning plate 490 has a connecting surface 491, an opposite cleaning surface 492, a scraper 493 and an opposite cutting surface 494. The cutting surface 494 intersects the cleaning surface 492. The cleaning plate 490 is fixed to the gate 430 by means of screws 402, see FIG. 16.

Figure 16:
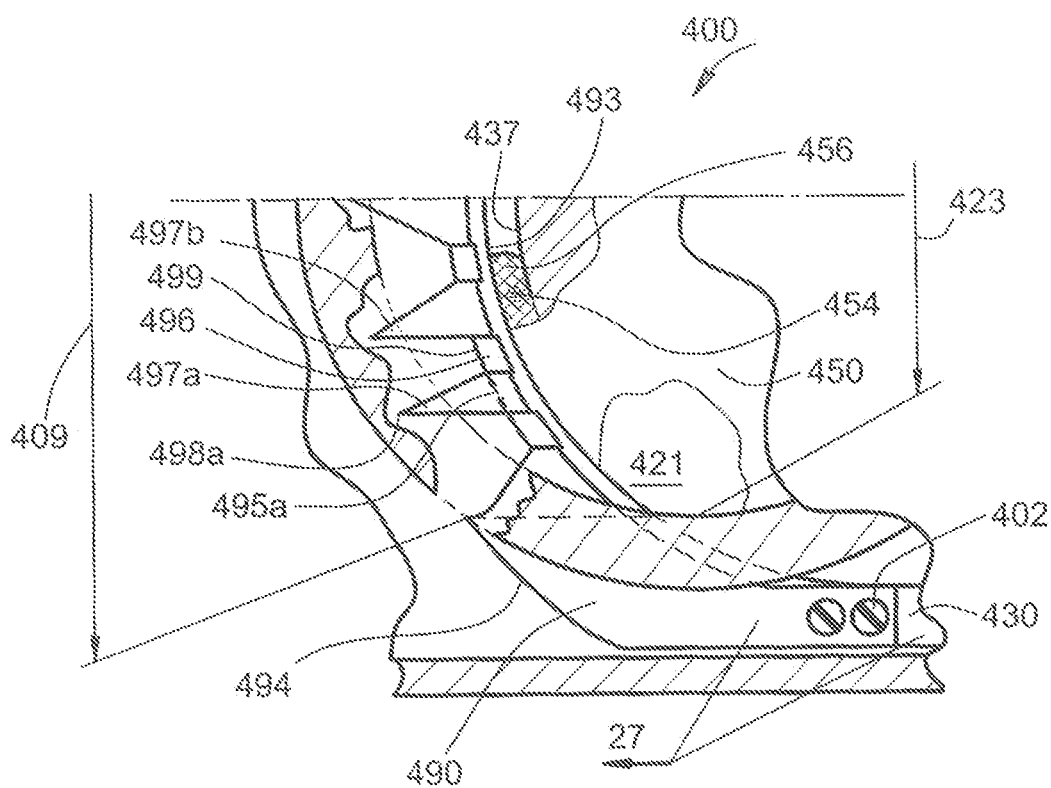
FIG. 16 is horizontal cross section view of the knife gate valve of FIG. 15 taken along section line 16-16.

FIG. 16 is horizontal cross section view of the knife gate valve of the FIG. 15 taken along section line 16-16.

The cleaning surface 492, see FIG. 15, locates opposite the sealing surface 422. The scraper 493 locates next to and across from the sealing belt 450 in front the inner end 437. When the gate 430 moves 25, see FIG. 14, the cleaning plate 490 and the inner end 437 move 25 relative to the sealing surface 422 and crossing the flow passage 412.

The cleaning plate 490, see FIG. 15, is positioned with a gap 408 in relation to the sealing surface 422. The cutting surface 494, see FIG. 16, has a toothed part 409.

The toothed part 409 is the part of the cutting surface 494, is corresponded to the size 423 of the orifice 421 in the direction across the gate 430 movement 27. The toothed part 409 is configured so that it is located relative to the orifice 421 when the gate 430 moves 27. Toothed part 409 forming several teeth in the cleaning plate 490, two of them (for description) are marked with position 497a, and 497b. Tooth 497a has tooth end 498a and a tooth base 495a. Tooth 497a expand from the tooth end 498a to the tooth base 495a. There is a recess 499 between the teeth 497a and 497b. Cleaning plate 490 has channels 496, see FIGS. 15 and 16 directed from the recesses 499 to the side of the scraper 493. The channels 496, see FIG. 15 is made in the cleaning plate 490 through the cleaning surface 492.

Moreover, in this embodiment of the knife gate valve 400, see FIG. 16, the inner end 437, the cutting surface 494, the scraper 493, are convex curved shape in plan. The sealing belt 450 is made of an elastic material 456 and has cords 454. The cords 454 (conventionally shown as two cords 454a and 454b), see FIG. 13, are flexible, non-tensile, they are arranged longitudinally in and fixed in the sealing belt 450. The cords 454 have cord ends 455 (one cord end 455b is conventionally marked) which are fixed to the body 410 together with the belt ends 452.

These option allow the invention to be used in knife gate valves with a semicircular inner end. The choice of the elastic material 456 of the sealing belt 450, the number of cords 455 and the distance 412 between them is in the competence of skill in the art. When the gate 430 moves 25 and transports 23 the sealing belt 450, the movement 23 of the cords 454 is similar to that of the non-stretchable sealing belt 350, see FIG. 9, of the previous knife gate valve 300.

The cords 454, see FIG. 13, set the movement of the sealing belt 450, and where there is no movement of the cords 454, there is no movement of the sealing belt 450. In the section 459 of the cord 454 (one section is conventionally shown), see FIG. 14, where the cord 454 does not move relative to the seat 420, the same section 459 of the sealing belt 450 also does not move relative to the seat 420.

When the sealing belt 450 is transported 23 around the inner end 437, see FIG. 13, the section 458 of the sealing belt 450 between the cords 454a and 454b (two cords are conventionally shown) deforms (shown by the dashed arrows), providing a smooth fit of the sealing belt 450 to the inner end 437.

The knife gate valve 400, see FIG. 14, operates in the flow of material 50 containing abrasive particles. When the gate 430 moves 26 to the open position, the abrasive particles 51 (one abrasive particle is conventionally shown) which have deposited on the sealing belt 450 on the seat orifice 421 side make no linear motion relative to the seat 420 and do not expose it to abrasive wear. The rest of the description of the knife gate valve 400 operation in the flow of material 50 containing abrasive particles is similar to the description of the previous knife gate valve 300 operation and the positive properties achieved also apply to this version.

Knife gate valve 400 includes a belt cleaner 417 with a blade 418. The belt cleaner 417 fixed in the chamber 411 of the body 410 on the other side from of the sealing surface 422 and the gate 430 in front of the packing's upper portion 483. The blade 418 locates next to and across from the sealing belt 450. When the gate 430 moves 26 to the open position, it transports 28 the sealing belt 450 relative of the packing's upper portion 483.

The knife gate valve 400 operates in the flow of material 50 containing abrasive particles. The abrasive particles 53 (one particle is conventionally shown), locate in the chamber 411, some of them designated by position 54 are deposited on the sealing belt 450 which transported 28 them. This is best shown in the FIG. 17.

Figure 17:
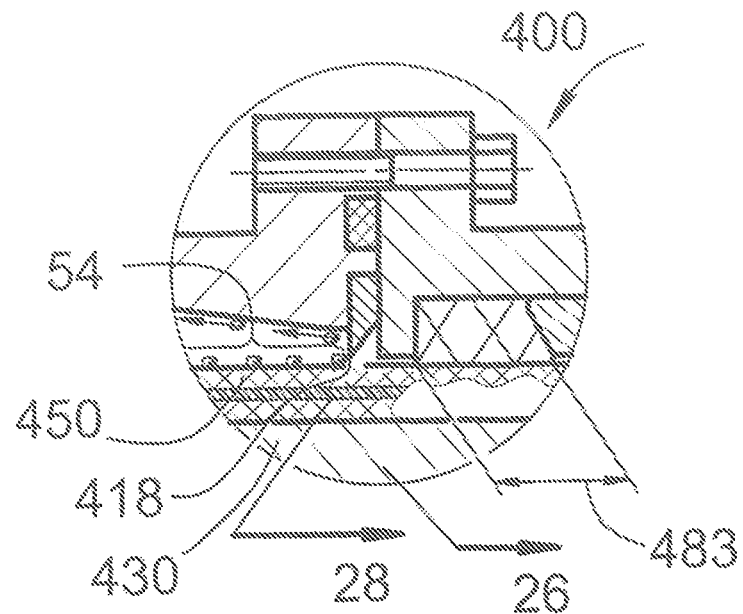
FIG. 17 is an enlarged view of the knife gate valve part of the FIG. 14, corresponding to section 17 of FIG. 14.

FIG. 17 is an enlarged view of the knife gate valve part of the FIG. 14, corresponding to section 17 of FIG. 14.

When the gate 430 moves 26 to the open position abrasive particles 54 are displaced from the sealing belt 450 by the blade 418. The cleaned sealing belt 450 does not expose to abrasive wear the packing's upper portion 483 during transport 28.

Stuffing box assembly 480 with the packing 481, see FIG. 13, is fixed to the body 410. The belt ends 452 and cord ends 455 are fixed to the body 410. The sealing belt 450, see FIG. 14, is tightly fitted along the flat surfaces 435 around the inner end 437 and the outer end 438. As will be apparent to those of skill in the art, when the gate 430 moving 25, linear motion absent between of the sealing belt 450 and the packing's bottom portion 485. Consequently, this the packing's bottom portion 485. is not exposes to abrasive wear. As result, the packing 481 abrasive wear is reduced (in existing valves, the abrasive particles on flat surfaces of the gate move relative to the packing of the stuffing box, exposing the gate and packing to abrasive wear).

Knife gate valve 400 includes clamps 416 fixed in the body 410, see FIG. 14. Clamps 416 tightly press the sealing belt 450 along the belt edges 457 to the gate 430, see FIG. 18

Figure 18:
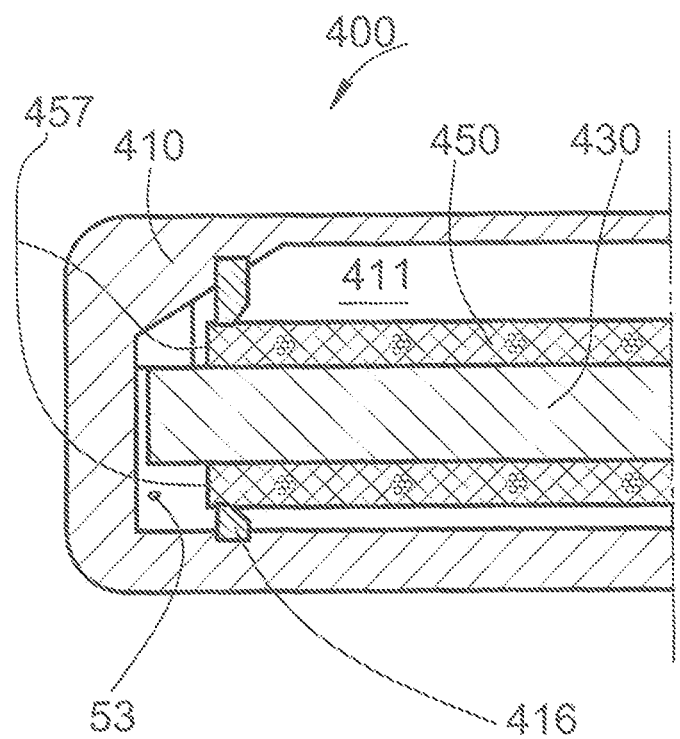
FIG. 18 is cross section view of the knife gate valve of FIG. 14 taken along section line 18-18.

FIG. 18 is cross section view of the valve of FIG. 14 taken along section line 18-18. When the knife gate valve 400, see FIG. 14, is operating in the flow of material 50 containing abrasive particles, some the abrasive particles 53 (one particle is conventionally shown), locate in the chamber 411.

The tightly pressing of the sealing belt 450 along the belt edges 457 to the gate 430, see FIG. 18, protects from abrasive particles 53 entering between the sealing belt 450 and the gate 430. This reduces the abrasive wear of the gate 430 and sealing belt 450.

In the knife gate valves versions described above options for fixing of the sealing belt with the body are possible, it is within the expected skill of one skilled in the art of knife gate valve design.

It is possible to design the sealing belt in the form of a flat band ring and locking section is a portion of the sealing belt attached to the body.

Options for fixing of the cleaning plate with the gate are possible, it is within the expected skill of one skilled in the art of knife gate valve design.

Depending upon the intended application for the knife gate valve, seat can be of various designs in the form of a monolithic part formed of a hard material (eg bronze, stainless steel, etc.) or plastic. Seat can be designs as an assembly including a metal seat ring and an O-ring made of synthetic materials such as EPDME, PDM, Nitrile and others. The seat may include a deflector to protect against abrasion. The seat orifice can be curved shape, usually round, sometimes rectangular. Sealing surface of the seat can be hard or elastic. These seat variants are applicable in accordance with the present invention. Packing can be made from PTFE, synth, fiber materials. Packing may include a EPDM O-Ring. The body can be of different designs—it can be designed as a split body; it can have two opposite staffing box in another variant. These body variants are applicable in accordance with the present invention. As will be understood by those of skill in the art, other options of connecting the actuator to the gate can be applied. The activator may have a hand wheel, an electric motor drive, or another type.

As will be apparent to those of skill in the art, while the discussion above has only discussed some knife gate valves, the present invention can be equally applied to other gate valves, in which the gate has flat and parallel surfaces. They will have the same abrasive wear reduction benefits. While the present invention has been described in terms of particular embodiments and applications, in both summarized and detailed forms, it is not intended that these descriptions in any way limit its scope to any such embodiments and applications, and it will be understood that many substitutions, changes and variations in the described embodiments, applications and details of the device illustrated herein and of their operation can be made by those skilled in the art without departing from the spirit of this invention. Accordingly, it is appropriate that the appended claims be construed broadly and in a manner consistent with the scope of the invention.

What is claimed is:

1. A knife gate valve comprising:
a body having a chamber, a flow passage intersecting the chamber;
at least one seat located in the body motionlessly and having a sealing surface, an orifice which is aligned with the flow passage;
a gate having two parallel flat surfaces;
an actuator connected to the gate, providing rectilinear reciprocating motion in the chamber between an open position and a closed position relative to the sealing surface across the flow passage;
wherein the knife gate valve having the combination of a baseplate for each seat that is located in the gate and also movable jointly with the gate relative to the sealing surface and across the flow passage with a non-stretchable sealing belt surrounding each baseplate and having a locking section fixed to the body with the gate and baseplate are movable relative to the sealing belt and in the closed position;
the sealing belt is brought into contact by the baseplate on the sealing surface, forming a seal between the baseplate and the seat, wherein in the open position the sealing belt is removed from the sealing surface by the baseplate.

2. The knife gate valve according to claim 1, wherein the body comprises of a main body for the seat and a stuffing box with a packing, wherein stuffing box is fixed to the main body,
the sealing belt has two belt ends which forming the locking section, and located in the body next to the seat from the side of the actuator.

3. The knife gate valve according to claim 1, wherein each sealing belt has an adjacent planar surface which is adjacent to the baseplate and an opposite remote planar surface with elastic properties.

4. The knife gate valve according to claim 1, wherein each baseplate is a separate item and is fixed in the gate, and the orifice is an extension of the flow passage.

5. The knife gate valve according to claim 1, wherein each baseplate is a single unit with the gate, and the orifice is an extension of the flow passage.

6. The knife gate valve according to claim 1, wherein each seat is a separate item and is fixed in the body, and the orifice is an extension of the flow passage.

7. The knife gate valve according to claim 1, wherein the seat is a single unit with the main body, and the orifice is an extension of the flow passage.

8. The knife gate valve according to claim 1, wherein the flow passage has two opposite connecting flanges, the gate has a scraper for each the baseplate,
each baseplate is a single unit with the gate, has two parallel flat base surfaces, two ends with roundings, there are two gaps, each between the gate and the said end,
wherein,
the base surfaces are parallel to the flat surfaces,
one of the ends is an inner end and an opposite to an outer end, wherein the ends are perpendicular to the movement of the gate,
each outer end is located on the actuator side,
each inner end is located in the chamber,
the sealing belt passes through the gaps and is positioned along the base surfaces and around the ends of the baseplate,
the roundings are connected with the base surfaces,
wherein
when the gate moves, the inner end moves relative to the sealing surface and crosses the flow passage,
the width of each the sealing belt is sufficient to completely cover of its corresponding sealing surface,
the scraper of each baseplate located in the gap opposite the corresponding inner end, next to and across the sealing belt.

9. The knife gate valve according to claim 1, comprises a cleaning plate with a scraper for each baseplate, the flow passage has two opposite connecting flanges,
the gate has the aperture of rectangular shape,
the baseplate is separate item, and has two parallel flat base surfaces, two baseplate edges, two ends each with roundings wherein,
the base surfaces are parallel to the flat surfaces, one of the ends is an inner end and an opposite is outer end,
the baseplate is fixed in the aperture along of the baseplate edges,
the ends are located in the aperture with gaps from the gate on opposite sides from the locking section in any position of the gate,
the ends are perpendicular to the movement of the gate, located in an aperture with gaps from the gate and on opposite sides from the locking section at any gate position,
the outer end is locates on the side of the actuator, the sealing belt passes through the gaps and is positioned along the base surfaces and around the ends, the width of the sealing belt is sufficient to completely cover the sealing surface,
the cleaning plate fixed to the gate, the scraper is located opposite of the inner end next to and across the sealing belt, when the gate moves, the cleaning plate and the inner end move relative to the sealing surface and cross the said flow passage.

10. A knife gate valve comprising:
a body having a chamber, a flow passage intersecting the chamber, an inlet flange and an opposite outlet flange;
a seat located in the body motionlessly on the side of one of the flanges, the seat having a sealing surface and an orifice which is aligned with the flow passage and is an extension of it;
a gate having two parallel flat surfaces, the outer ends and the inner end located in the chamber;
an actuator which provided the gate a rectilinear reciprocating moving in the chamber between an open position and a closed position relative to the sealing surface across the flow passage;
wherein the knife gate having the combination of roundings connecting the flat surfaces with the inner end and outer end with a connection of the actuator to the gate on either side of its outer end and with a gap between the gate and the actuator with a sealing belt having the belt edges;
the belt ends tightly fitting along the flat surfaces and around the inner end and the outer end wherein the gap is sufficient for the passage of the sealing belt with a cleaning plate fixed to the gate and having a connecting surface, an opposing cleaning surface, a scraper and an opposing cutting surface;

the scraper locates next to and across from the sealing belt in front of the inner end with the body has a fixing surface to which the belt ends are fixed with in the closed position, the sealing belt is brought into contact with the sealing surface by means of the gate, forming a seal between the gate and the seat;

and in the open position, the sealing belt is removed from the sealing surface by the gate.

11. The knife gate valve according to claim 10, wherein the inner end and the outer end are perpendicular to the movement of the gate, and the sealing belt is non-stretchable.

12. The knife gate valve according to claim 10, wherein the sealing belt is non-stretchable, has an adjacent planar surface which is adjacent to the gate, and an opposite remote planar surface with elastic properties.

13. The knife gate valve according to claim 10, further comprising a stuffing box with a packing, is fixed to the body behind the belt ends, wherein the sealing belt is in contact with the packing in any position of the gate.

14. The knife gate valve according to claim 10, further comprising clamps which are fixed in the body and tightly pressing the sealing belt along the belt edges to the gate.

15. The gate valve according to claim 10, wherein the cleaning plate positioned with a gap in relation to the sealing surface, the cutting surface has a toothed part forming in the cleaning plate several teeth with tooth bases and tooth ends, recesses between the teeth, the cleaning plate has channels made in its through the cleaning surface and directed from the recesses to the side of the scraper, wherein, the toothed part is the part of the cutting surface, is corresponded to the size of the orifice in the direction across the gate movement, is configured so that it is located relative to the orifice when the gate moves, the teeth expand from the tooth ends to the tooth bases.

16. The knife gate valve according to claim 13, further comprising a belt cleaner with a blade, that is fixed in the chamber on the other side from the sealing surface and the gate, wherein the belt cleaner is located in front of the packing, and the blade is located next to and across from the sealing belt.

17. The knife gate valve according to claim 10, wherein the inner end, the cutting surface, the scraper, are convex curved shape in plan, the outer end is straight segment in plan which is perpendicular to the gate movement, the sealing belt is made of elastic material, has flexible non-stretchable cords arranged longitudinally and fixed therein, wherein the said cords have cord ends which are fixed to the body together with the belt ends.

18. The knife gate valve according to claim 17, wherein the cleaning plate positioned with a gap in relation to the sealing surface, the cutting surface has a toothed part forming in the cleaning plate several teeth with tooth bases and tooth ends, recesses between the teeth, the cleaning plate has channels made in it through the cleaning surface and directed from the recesses to the side of the scraper, wherein the toothed part is the part of the cutting surface, is corresponded to the size of the orifice in the direction across the gate movement, is configured so that it is located relative to the orifice when the gate moves, the teeth expand from the tooth ends to the tooth bases.

\* \* \* \* \*